United States Patent [19]

Johnston

[11] Patent Number: 5,224,676
[45] Date of Patent: Jul. 6, 1993

[54] UNIVERSAL ROTISSERIE ATTACHMENT BRACKETS

[75] Inventor: Robert L. Johnston, Columbus, Ga.

[73] Assignee: W. C. Bradley Company, Columbus, Ga.

[21] Appl. No.: 743,079

[22] Filed: Aug. 9, 1991

[51] Int. Cl.⁵ .............................................. A47J 49/00
[52] U.S. Cl. ................................ 248/231.7; 99/421 R; 99/421 HV; 126/25 R
[58] Field of Search ............... 248/231.7; 126/25 R, 126/25 A, 25 AA; 99/421 HV, 421 R, 419

[56] References Cited

U.S. PATENT DOCUMENTS

| | | | |
|---|---|---|---|
| 2,046,352 | 7/1936 | Warner | 99/421 HV |
| 2,505,976 | 5/1950 | Leon | 99/421 HV |
| 2,819,667 | 1/1958 | Victor | 126/25 |
| 2,845,856 | 8/1958 | Sack | 99/421 HV |
| 2,999,428 | 9/1961 | Mariani | 248/231.7 X |
| 3,247,779 | 4/1966 | Willman | 99/421 HV |
| 3,442,202 | 5/1969 | Ishida | 99/421 |
| 3,742,839 | 7/1973 | Maley | 99/421 HV |
| 4,469,019 | 9/1984 | Baer | 99/421 HV |
| 4,817,514 | 4/1989 | Hitch et al. | 99/419 |
| 4,924,766 | 5/1990 | Hitch | 99/421 HV |

*Primary Examiner*—David L. Talbott
*Attorney, Agent, or Firm*—Hopkins & Thomas

[57] ABSTRACT

A universal rotisserie mounting bracket assembly is disclosed, the assembly mounting the motor on a side shelf of a barbecue grill cart for distancing the motor from the intense heat of the grill and prolonging its life. The bracket assembly is designed for vertical adjustability of the motor, ensuring compatibility with a plurality of differently configured grill castings and facilitating vertical adjustment of the rod for adjusting cooking times.

14 Claims, 2 Drawing Sheets

5,224,676

UNIVERSAL ROTISSERIE ATTACHMENT BRACKETS

BACKGROUND OF THE INVENTION

Rotisserie units are often used to cook food, the units including a rod which receives the food and is suspended over a barbecue grill or pit or with a similar arrangement. Normally, the rotisserie motor is mounted on a bracket which is secured to the side of the grill, the rotisserie rod being inserted into a coupling on the motor for causing the food to be rotated over the heat source, i.e. coals, gas burner, etc. The opposite end of the rod is supported for rotation by a bracket with provision being made in some cases for vertical adjustment of the rotisserie rod. An example of this type of arrangement is shown by U.S. Pat. No. 4,924,766 to Hitch for a Rotisserie Assembly, the patent having a common assignee with the instant invention.

While such an arrangement is satisfactory, the disposition of the motor immediately adjacent or attached to the firebox may cause problems due to the intense heat generated which may reduce the life of the motor. Another concern with rotisseries is that the rotisserie assembly is not supplied with the grill when purchased but are instead sold as aftermarket accessories. Due to the different configurations of fireboxes supplied by the different manufacturers, it may be difficult to fit a rotisserie assembly on a particular grill.

SUMMARY OF THE INVENTION

It is, therefore, one of the principal objects of the present invention to provide universal rotisserie attachment brackets, with the motor holding bracket being mounted at a location remote from the firebox so as to remove the motor from the vicinity of the intense heat generated in the firebox, thereby prolonging its life.

Another object of the present invention is to provide universal rotisserie attachment brackets in which the rotisserie motor and the rod assembly can be mounted in a plurality of vertically adjusted positions and in which the adjustments are quickly and easily made for raising or lowering the rotisserie rod and the food mounted thereon.

A further object of the present invention is to provide universal rotisserie attachment brackets which can be mounted on a majority of the barbecue grills currently available, the mounting arrangement being completely independent of the configuration of the firebox.

A still further object of the present invention is to provide a universal assembly for supporting a rotisserie in which the bracket members are quickly and economically produced, as in a stamping operation and are durable for providing a long service life.

These and additional objects are attained by the present invention which relates to universal rotisserie attachment brackets for supporting a rotisserie motor and rotisserie and/or spit rod for cooking food over a barbecue grill or the like. The motor support bracket means is designed to be mounted on a side shelf of the barbecue grill, this remote mounting distancing the rotisserie motor from the heat generated by the grill. The motor holding bracket includes a mounting bracket member which attaches to the motor support bracket and is vertically adjustable thereon, providing a plurality of vertically adjusted positions for supporting the motor. The spit rod support bracket, where used, is normally mounted directly to the firebox on the side opposite the motor for supporting the opposite end of the rod. The bracket members are easily mounted and the adjustments to different heights are quickly and easily made.

Various additional objects and advantages of the present invention will be become apparent from the following detailed description, with reference to the accompanying drawings.

DETAILED DESCRIPTION OF THE PREFERRED EMBODIMENT

Figure 1:
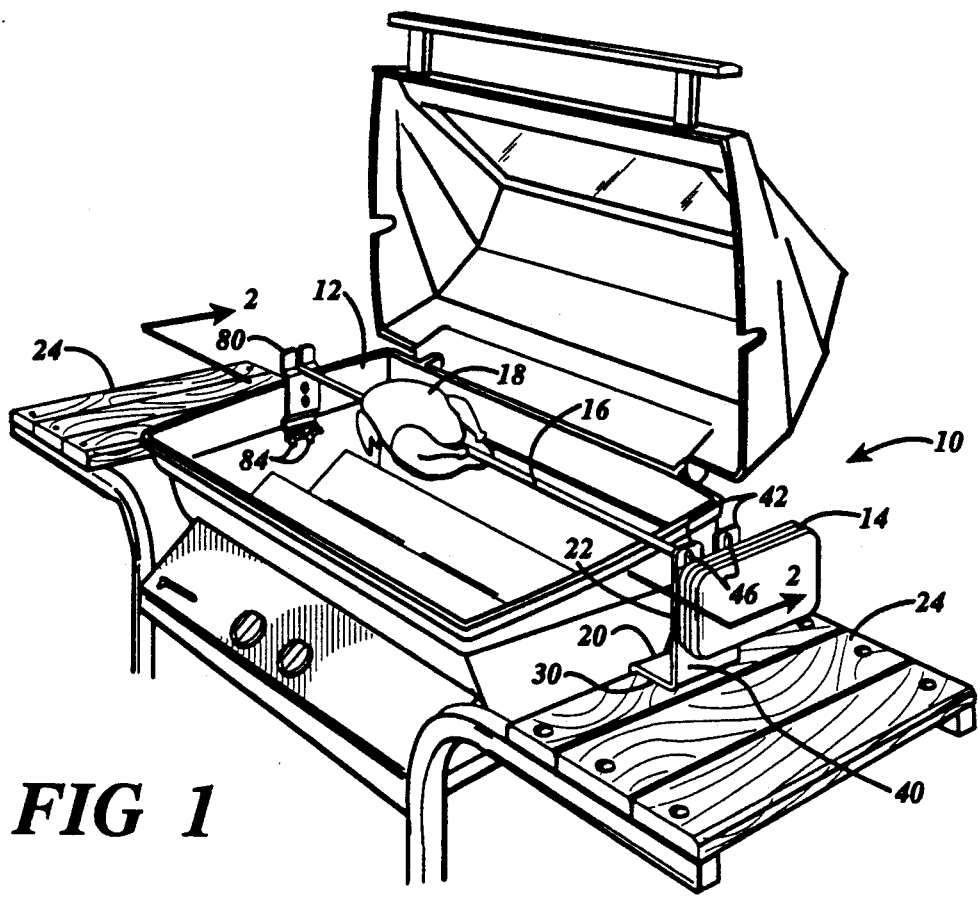
FIG. 1 is a perspective view showing the present universal rotisserie attachment brackets in mounted position on a barbecue grill and cart assembly.
Figure 2:
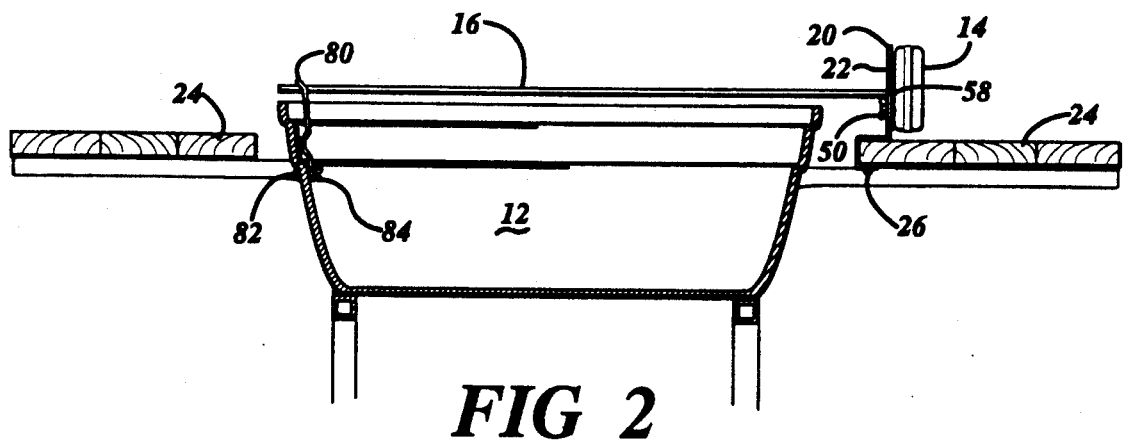
FIG. 2 is a cross-sectional view, illustrating the mounting arrangement of the brackets, the section being taken on line 2—2 of FIG. 1.

Referring now more specifically to the drawings, and to FIG. 1 in particular, numeral 10 designates generally a rotisserie assembly shown in installed position, over the firebox 12 of a barbecue grill. The assembly includes a motor 14 and a rotisserie or spit rod 16 which receives the food or a food containing basket to be suspended thereon as illustrated by the roasting chicken 18. Motor 14 is supported by a motor support bracket means 20, which may receive the motor directly or which may receive a motor holding bracket 22, which is used to adjust the motor vertically on the first bracket 20. As shown in FIGS. 1 and 2, the motor support bracket is mounted to a side shelf 24, where it is distanced from the heat generated in the firebox. The motor support bracket is secured to the side shelf with a pair of thumb screws 26 or the like which are disposed in threaded apertures 28 located in the lowermost portion of bracket 20.

As seen in FIG. 2, the bottom portion of the motor support bracket 20 is C-shaped so as to slip onto a side shelf 24 or an individual slat 30 of a side shelf, whereupon the thumb screws are tightened against the bottom portion of the side shelf. Where the side shelf is made of wood, as is common with barbecue grills, the thumb screws may be tightened to such a degree as to bite into the wooden slat, thereby providing a very secure mounting for holding the motor.

Figure 3:
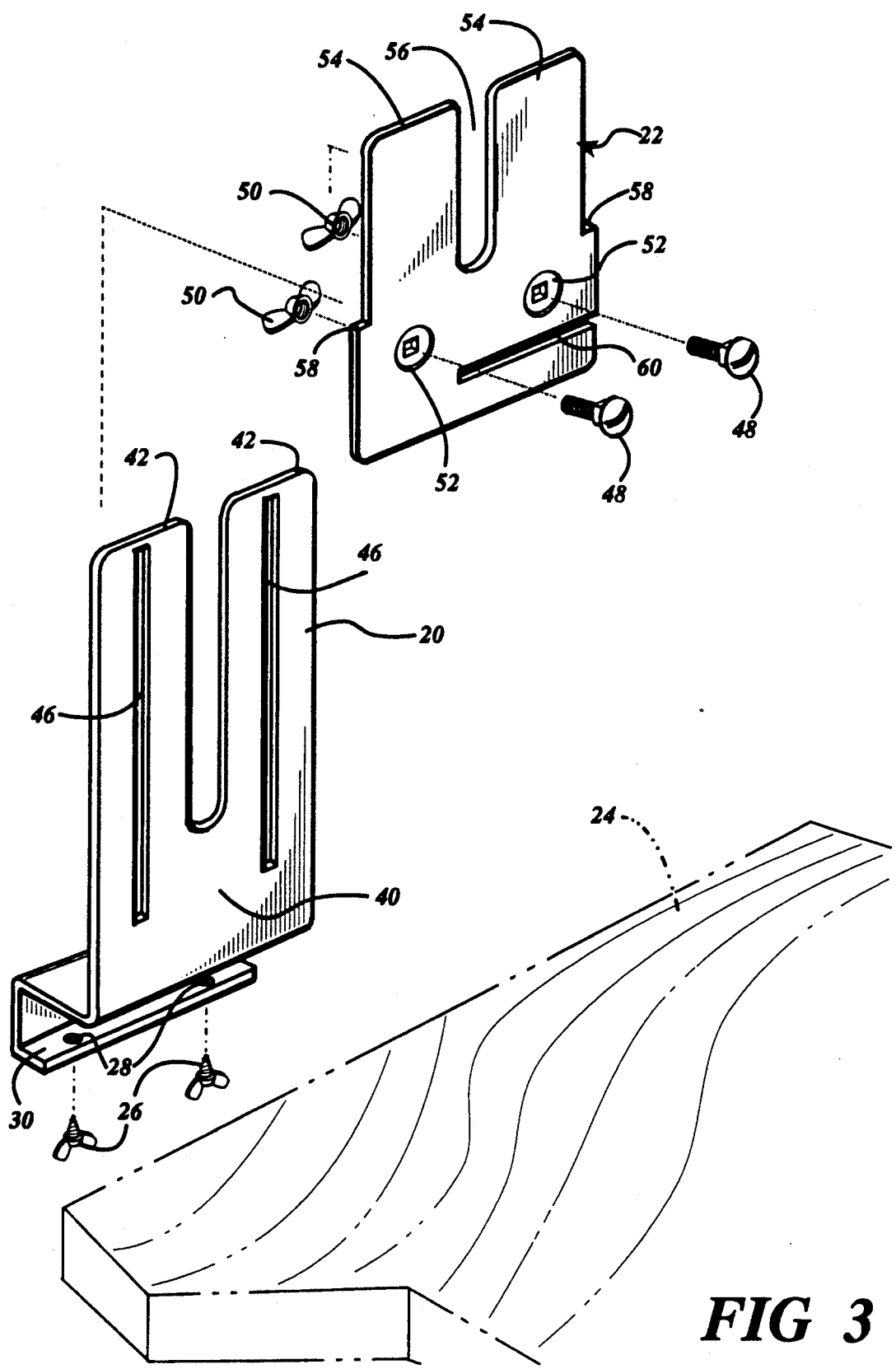
FIG. 3 is an exploded perspective view of the motor support bracket, illustrating the component parts thereof.

Referring to FIG. 3, it will be noted that the bracket which supports the motor has a vertical portion 40 which is disposed generally perpendicular to the lower C-shaped portion. The vertical portion is substantially U-shaped in configuration having upstanding arms 42 and a central recess 44 which receives the end of the spit rod which is coupled to the motor. The motor itself is normally supplied with spaced right angular clips on the inside wall thereof (not shown) which extend outwardly therefrom and then parallel thereto forming a recess therebetween for receiving arms 42. Thus, with arms 42 inserted in the clips of the motor, the motor is releasably secured on bracket 20, thereby providing one of the vertically adjusted positions in which the motor may be disposed. Each of the arms 42 are formed with a slot 46 therein, the slots disposed centrally in the arms 42 and extending in axial alignment therewith. These slots are aligned with apertures 52 in the bracket 22 and receive bolts 48, the bolts being secured with wing nuts 50. The bolts 48 extend through the apertures 52 in the motor holding bracket 22, thereby securing the motor holding bracket 22 to the motor support bracket 20.

With this optional bracket 22 in place, the motor may be adjusted to a plurality of vertically adjusted positions, by loosening the wing nuts and sliding the motor holding bracket upwardly or downwardly within the slots 46, thereby providing adjustment for different types of grill casting shapes and also for raising and lowering the food being cooked on the rotisserie. As shown in FIG. 3, the motor holding bracket 22 is also substantially U-shaped, having upstanding arms 54, with a central recess 56 through which the spit rod extends for coupling to the motor. At the lowermost portion of arms 54, abutments 58 are formed, the abutments serving to support the motor by virtue of the right angular clips provided on the back side of the motor housing. The motor holding bracket 22 is also formed with a horizontal slot 60 which is used in conjunction with the arm 54 located thereabove to support the motor in a generally horizontal position. The horizontal position disposes the spit rod in a substantially lower position to either lower the food being cooked or lower the rotisserie rod to a position where it will intersect with the opening formed in the top or bottom casting of the barbecue grill. The vertical position (not shown) disposes the rod at a higher level than the horizontal position, due to the fact that the coupling for the rod is normally nearer the top of the motor.

A spit rod support bracket 80 is shown mounted to the inside of the bottom casting on the opposite side of the motor for supporting the distal end of the support rod 16. Bracket 80 is secured to the casting using screws 82 and wing nuts 84. Where the casting is supplied with a cut-out or indentation for receiving a spit rod, the bracket 80 may be removed or it may be used for raising the distal end of the rod when necessary.

Thus, a rotisserie assembly is provided in which the height of the rotisserie rod above the heat source is easily and quickly changed for varying cooking times and/or the degree of heat which is transmitted to the food. In addition, a universal rotisserie attachment bracket means is provided which distances the motor from the fire box, thereby prolonging its life. The use and operation of the present invention are substantially as described hereinabove.

While an embodiment of a rotisserie assembly and modifications thereof have been shown and described in detail herein, various additional changes and modifications may be made without departing from the scope of the present invention.

I claim:

1. A universal rotisserie mounting bracket assembly for mounting a rotisserie unit to be used in conjunction with a barbecue grill comprising a support means for the barbecue grill, a barbecue grill having a fire box in which heat is generated mounted on said support means, shelf means mounted on said support means and a bracket means for securement to said shelf means and when secured to said shelf means said bracket means being laterally displaced from said fire box a distance to prevent contact with said first box, said bracket means having a lower portion designed for engaging the shaft and an upper portion designed for receiving a rotisserie motor, said lateral displacement for inhibiting convective and conductive heat transfer between said fire box and said motor.

2. A universal rotisserie mounting bracket as defined in claim 1 in which said lower portion of said bracket is C-shaped and receives a portion of the shelf and said bracket includes securing means disposed through said lower portion for engaging the shelf.

3. A universal rotisserie mounting bracket as defined in claim 1 in which said upper portion of said bracket is U-shaped with a central recess for receiving a rotisserie rod therethrough.

4. A universal rotisserie mounting bracket assembly for prolonging the life of a rotisserie motor mounted to a barbecue grill assembly, comprising:
a barbecue grill;
means for supporting said grill;
shelf means disposed on said means for supporting said grill;
a lower bracket portion for securing said lower portion to said shelf means such that said bracket is spaced from the grill a distance to prevent contact of said bracket with the grill; and
an upper bracket portion connected to said lower bracket portion, said upper bracket portion for supporting said rotisseries motor for preventing conductive and/or convective heat transfer between said barbecue grill and said rotisserie motor by remote placement of said motor relative to said grill.

5. A universal rotisserie mounting bracket assembly as defined in claim 4 in which said upper bracket portion includes a slot means formed therein, and said assembly includes a second bracket means with at least one aperture formed therein and corresponding with said slot means and a fastening means disposed through said corresponding slot and said aperture and being selectively adjustable for moving said second bracket means relative to said first bracket means.

6. A universal rotisserie mounting bracket assembly as defined in claim 4 in which said upper bracket portion includes a pair of spaced vertical slots and said second bracket means includes a pair of spaced, corresponding apertures, and fastening means disposed through said slots and said apertures for vertically adjusting the motor relative to said upper bracket portion.

7. A universal rotisserie mounting bracket assembly as defined in claim 4 in which said upper bracket portion includes arm means which extend vertically therefrom for receiving the motor with a central recess therebetween for receiving the rotisserie rod.

8. A universal rotisserie mounting bracket assembly as defined in claim 7 in which said assembly includes fastening means disposed through said lower bracket portion and against the shelf for securing said assembly thereon.

9. A universal rotisserie mounting bracket assembly as defined in claim 8 in which said upper bracket portion includes abutment means disposed near the lower end of said arm members for serving as stops for the motor and a generally horizontal slot for receiving and orienting the motor in a horizontal manner.

10. A universal rotisserie mounting bracket assembly for prolonging the life of a rotisserie motor mounted to a barbecue grill assembly, comprising: a barbecue grill and a barbecue grill support means, at least one shelf member mounted on said grill support, a lower bracket portion for securing to said shelf member such that said bracket is spaced from the grill a distance to prevent contact of said bracket with the grill, an upper bracket portion connected to said lower bracket portion, said upper bracket portion for supporting said rotisserie motor such that said bracket reduces or eliminates convective and/or conductive heat transfer between said barbecue grill and said rotisserie motor by remotely positioning said motor away from said grill and providing spacing therebetween.

11. A universal rotisserie mounting bracket assembly as defined in claim 10 in which said lower bracket portion includes a generally C-shaped lower portion for engaging a portion of the side shelf, fastening means disposed through said C-shaped lower portion and against the side shelf for securing said lower bracket portion thereon and arm members extending vertically from said C-shaped lower portion for selectively receiving the motor.

12. A universal rotisserie mounting bracket assembly as defined in claim 11 in which said upper bracket portion includes slot means disposed in said arm members and said arm members are spaced apart for defining a recess therebetween and receiving the rotisserie rod.

13. A universal rotisserie mounting bracket assembly as defined in claim 10 in which said assembly also includes a rod holding bracket means disposed on the side of the grill opposite the motor.

14. A universal rotisserie mounting bracket assembly as defined in claim 10 in which said upper bracket portion includes spaced vertically disposed arm members for receiving the motor in a vertical orientation and a horizontal slot means for receiving the motor in a horizontal orientation in connection with at least one of said arm means.

* * * * *